US010218246B2

United States Patent
Farb et al.

(10) Patent No.: US 10,218,246 B2
(45) Date of Patent: Feb. 26, 2019

(54) VARIABLE DIAMETER AND ANGLE VERTICAL AXIS TURBINE

(75) Inventors: Daniel Farb, Beit Shemesh (IL); Avner Farkash, Beit Shemesh (IL)

(73) Assignee: Daniel Farb, Beit Shemesh (IL)

( * ) Notice: Subject to any disclaimer, the term of this patent is extended or adjusted under 35 U.S.C. 154(b) by 1429 days.

(21) Appl. No.: 14/232,629

(22) PCT Filed: Jul. 12, 2012

(86) PCT No.: PCT/IB2012/053567
§ 371 (c)(1),
(2), (4) Date: Jan. 14, 2014

(87) PCT Pub. No.: WO2013/008200
PCT Pub. Date: Jan. 17, 2013

(65) Prior Publication Data
US 2014/0167414 A1    Jun. 19, 2014

Related U.S. Application Data

(60) Provisional application No. 61/507,623, filed on Jul. 14, 2011.

(51) Int. Cl.
| F03D 7/06 | (2006.01) |
| H02K 7/18 | (2006.01) |
| F03D 3/00 | (2006.01) |
| F03D 3/06 | (2006.01) |

(52) U.S. Cl.
CPC ........... *H02K 7/1823* (2013.01); *F03D 3/005* (2013.01); *F03D 3/062* (2013.01); *F03D 7/06* (2013.01); *F05B 2240/213* (2013.01); *F05B 2240/313* (2013.01); *Y02E 10/74* (2013.01)

(58) Field of Classification Search
CPC . F03D 3/06; F03D 3/061; F03D 3/064; F03D 7/06
USPC .............................................. 416/1
See application file for complete search history.

(56) References Cited

U.S. PATENT DOCUMENTS

| 1,646,673 | A | * | 10/1927 | Wilson | F03D 3/065 416/168 R |
| 1,697,574 | A | * | 1/1929 | Savonius | F03D 3/007 416/110 |
| 2,596,726 | A | * | 5/1952 | Rydell | B63H 9/02 416/142 |
| 3,093,194 | A | * | 6/1963 | Rusconi | F03D 3/067 416/119 |
| 3,942,909 | A | * | 3/1976 | Yengst | F03D 3/065 416/119 |
| 4,004,861 | A | * | 1/1977 | Soules | F03D 3/067 416/119 |
| 4,293,274 | A | * | 10/1981 | Gilman | F03D 3/061 416/132 B |

(Continued)

FOREIGN PATENT DOCUMENTS

WO        8404362        11/1984

*Primary Examiner* — Kayla McCaffrey

(57) ABSTRACT

A wind turbine, particularly vertical axis, whose diameter is extensible and retractable, either from the length of the arms or the angle of the blades, or both, has advantages in operating in low wind speed regimes and surviving in high wind speed, regimes. The current application describes how to construct such a turbine, particularly the control mechanisms and the optimal aerodynamic configurations of the blades.

20 Claims, 9 Drawing Sheets

(56) References Cited

U.S. PATENT DOCUMENTS

| | | | | |
|---|---|---|---|---|
| 4,449,053 | A | * | 5/1984 | Kutcher .................. F03D 80/70 290/44 |
| 4,718,822 | A | * | 1/1988 | Riezinstein ............... F03D 7/06 416/119 |
| 6,283,711 | B1 | * | 9/2001 | Borg ....................... F03D 3/065 416/135 |
| 6,910,873 | B2 | * | 6/2005 | Kaliski ................... F03D 3/005 416/119 |
| 7,094,017 | B2 | * | 8/2006 | Kurita ................... F03B 17/067 415/4.2 |
| 7,220,107 | B2 | * | 5/2007 | Kaneda ................. F03D 3/0409 416/186 A |
| 7,766,601 | B2 | | 8/2010 | Vida Marques |
| 2009/0066090 | A1 | * | 3/2009 | Boone ....................... F03D 3/02 290/55 |
| 2009/0196753 | A1 | | 8/2009 | Yan |

\* cited by examiner 11. tension gear 12. chain

Figure 4 Shaft Offset

VARIABLE DIAMETER AND ANGLE VERTICAL AXIS TURBINE

FIELD AND BACKGROUND OF THE INVENTION

The present invention relates to systems, devices, and methods for a wind turbine with variable diameter blades whose diameter is controlled by arm length and/or angle.

This addresses the problem of how a turbine can make use of low wind speeds but survive in high wind speeds, or even just how to survive in high wind speeds alone. It shows how to achieve various efficiencies based on the configuration of the blades combined with a parameter called the Tip Speed Ratio (TSR). This requires coordination of the parameters of a turbine in order to achieve the proper shape and control configuration for a particular speed. An example of an application is the environment of parts of India, where the wind speeds are low most of the year and high at other times during monsoon season, or in other hurricane areas of the world.

Here is an examination of some potential prior art:

Dawson (US 2010/0158687) is not relevant because it applies to rotor blades and involves changing the length of the blades. That is different from the current application, which does not discuss changing the blade shape but does discuss changing the turbine diameter. It is also specific for a horizontal axis turbine.

Potter (U.S. Pat. No. 4,342,539) has a concept of decreasing the width of the wind machine but proposes a totally unrelated concept of telescoping numerous airfoils. Our application is different in that it does not use telescoping and in some embodiments uses non-airfoil blades. Potter depends on sails and furling, whereas we use solid blades. Potter's tower is capable of tilting, whereas ours is ideally rigid. His sails lower into storage mode, whereas the current application involves retraction.

Hulls (U.S. Pat. No. 5,531,567) applies to tensioning Darrieus type blades and is not relevant.

Quraeshi (U.S. Pat. No. 6,394,745) uses a pitch control on lift vertical axis blades. It does not alter the distance of the blade center from the shaft.

Jamieson (U.S. Pat. No. 6,972,498) extends the outer diameter through various means, whereas the current application works by adjusting either the internal diameter or the angle.

In summary, there is no prior art known to the authors of this application that addresses the mechanics and aerodynamics of the current invention.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention relates to the production of electrical power from a wind turbine using variable diameters, angles, and associated enabling systems. According to the present invention, there are provided several devices and methods of a wind turbine design.

The invention applies to any fluid flows, whether wind, water, or other, but for convenience, the term "wind" may be used in place of any other fluid, as the major envisaged use is with wind turbines, and, secondarily, underwater turbines. Note that the concept is equally applicable to hydrokinetic turbines in locations where flow speed may increase substantially, as during flood season.

All systems and shafts are considered to be attached to some mechanism or object that receives the mechanical energy and converts it to useful energy, such as a generator that converts it to electricity or a system that converts it to heat, or a mechanical system connected to a machine such as a pump.

The primary use of this invention is envisaged to be with drag-type blades or with drag-type blades with a lift component. Drag blades operate primarily by catching the "push" of the fluid, like cups, and lift blades operate primarily like wings, which induce movement from high to low pressure zones. However, it may also be applicable to lift-type blades.

The association of a VAWT and increasable/decreasable blade diameters, meaning that they change their radial span, is innovative in the conditions described. In one embodiment, this is for drag blades. In one embodiment, this change may also apply to a change in orientation of the blades, such as a differing overlap. In one embodiment, this can be achieved by an offset in the distance from the shaft. In another embodiment, the blades themselves can extend and retract. If the blades extend at lower wind speeds (14) in FIG. 4, bringing them closer together enhances survival in high wind speeds (13). This is novel for, among other blade numbers, 2 and 3 blade combinations, drag and lift.

In one embodiment, they are under electrical control. In one embodiment of that, the electrical control maintains their diameter such that a specified output of energy is achieved.

In summary, many new combinations are disclosed, including any two or more of the points discussed above and in the rest of the application.

Figure 1:
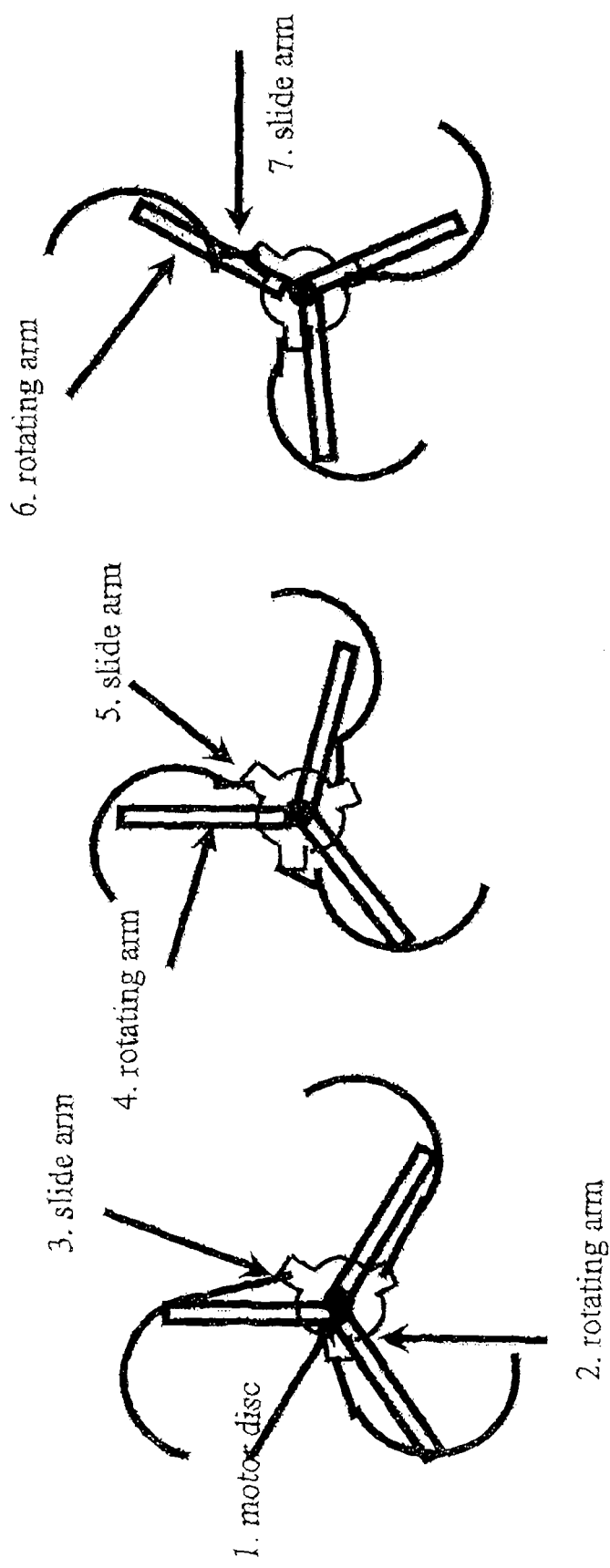
FIG. 1 is a diagram of a double-armed diameter-changing mechanism.

FIG. 1 is a diagram of a double-armed diameter-changing mechanism. This mechanism has the option of two driving movements, rotation or sliding. A motor disc (1) is at the center. The center of rotation for each blade is on an arc parallel to the ground. The rotating arm (2, 4, 6) can rotate clockwise while the sliding arm (3, 5, 7) moves inwards towards the shaft or away from the shaft to rotate the blade counterclockwise. The drawings show the motor for driving the rotating arm only.

The system can work with any number of blades.

Figure 2:
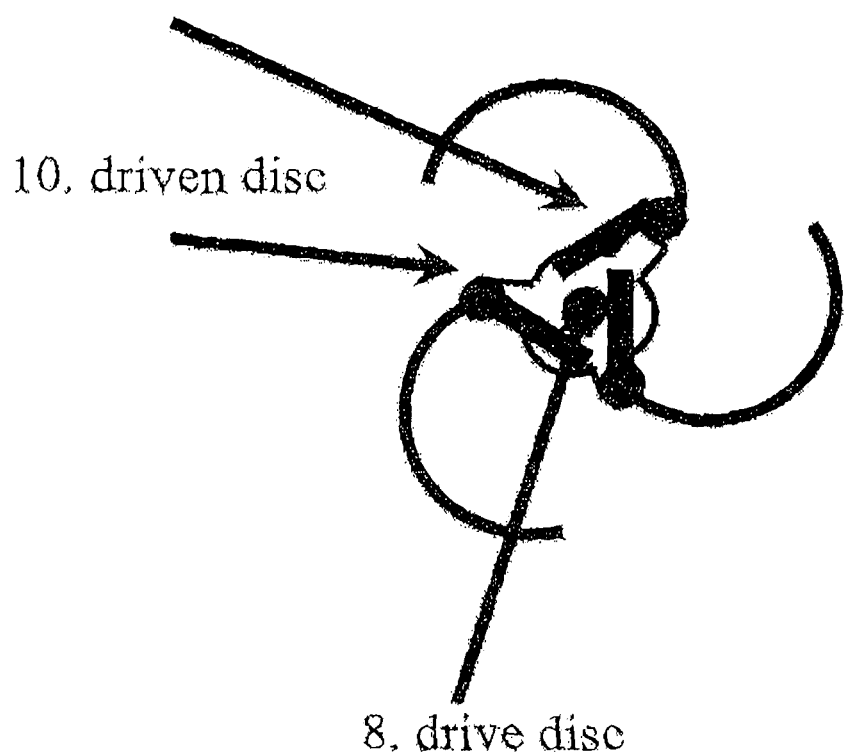
FIG. 2 is a diagram of a drive and driven disc diameter-changing mechanism.

FIG. 2 is a diagram of a drive and driven disc diameter-changing mechanism. This mechanism uses a driving motor inside the shaft rotating the drive disc (8). Each connecting arm (9) is attached to the outer circumference of the driving and driven discs with a connection means such as pins. The connecting arm pushes the blade to extend when the dive disc (8) rotates counterclockwise. When pulling action is required to reduce the radius of the turbine, the drive disc rotation is clockwise. The rotating axis of the blades is around the driven disc (10) and is in a fixed position relative to the shaft center.

Figure 3:
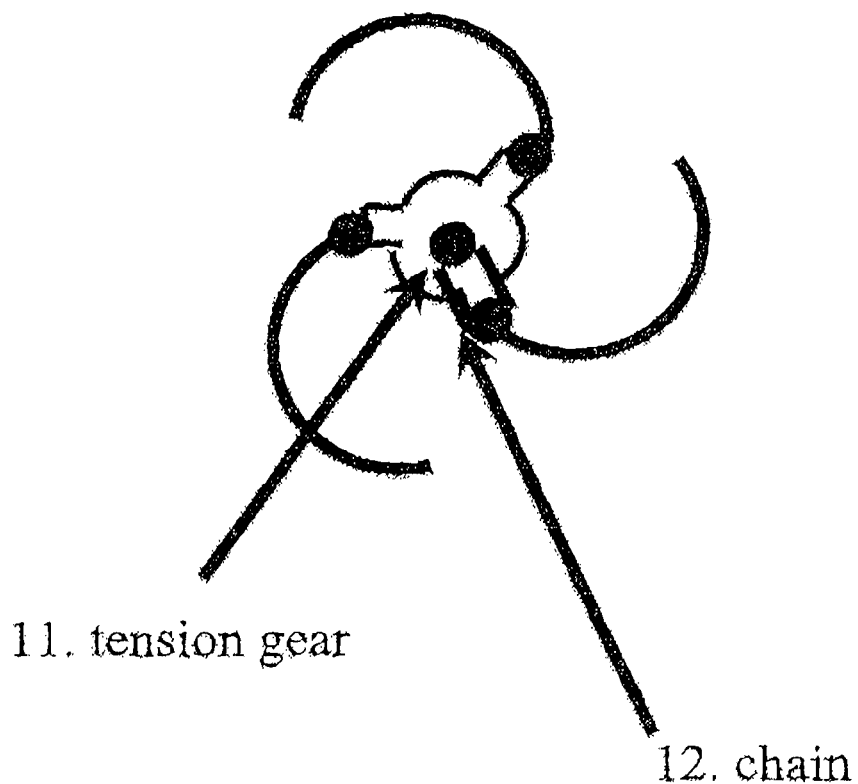
FIG. 3 is a diagram of a chain and tension gear diameter-changing mechanism.

FIG. 3 is a diagram of a chain and tension gear diameter-changing mechanism. This mechanism works on chain (12) and gears (13) driven by central motor (14) using a pinion gear. Each blade has its own gear with a given ratio of transmission to move its angle. Clockwise chain rotation causes the blades to open wide. The rotating axis of the blades is around the driven disc (13) and is in a fixed position relative to the shaft center. Two small gears apply tension on the chain.

The additional two small gears (11) apply continuous tension on the chain.

Figure 4:
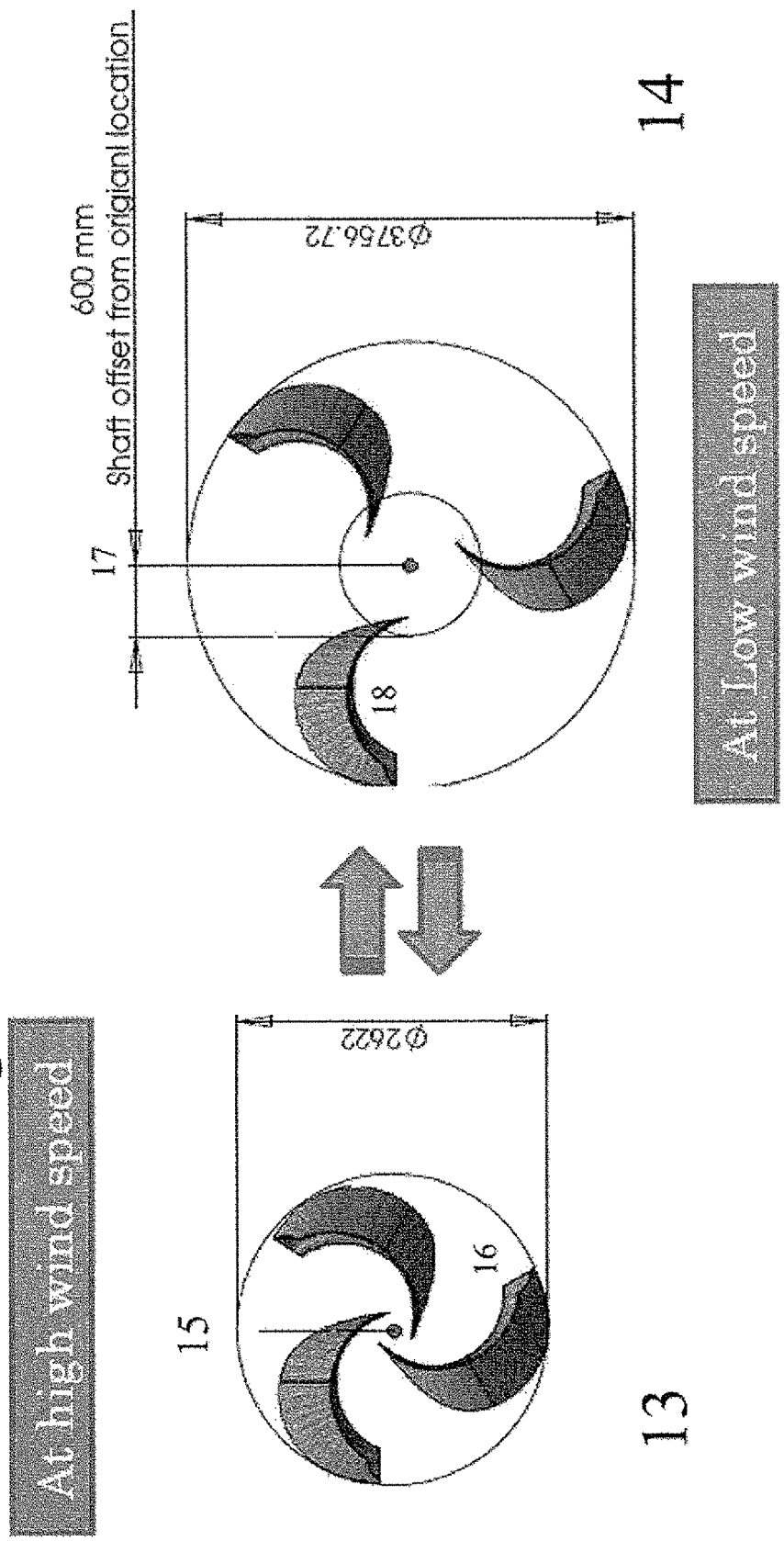
FIG. 4 is a diagram of a shaft offset diameter-changing mechanism.

FIG. 4 is a diagram of a shaft offset diameter-changing mechanism. Configuration (13) is contracted for high wind speeds, and (14) has an expanded diameter for low speeds. Points (15) and (17) are the shafts and (16) and (18) are the blades, whose distances from the shaft simply increase and decrease, ideally using at least one sliding arm (not shown) to adjust that.

Figure 5:
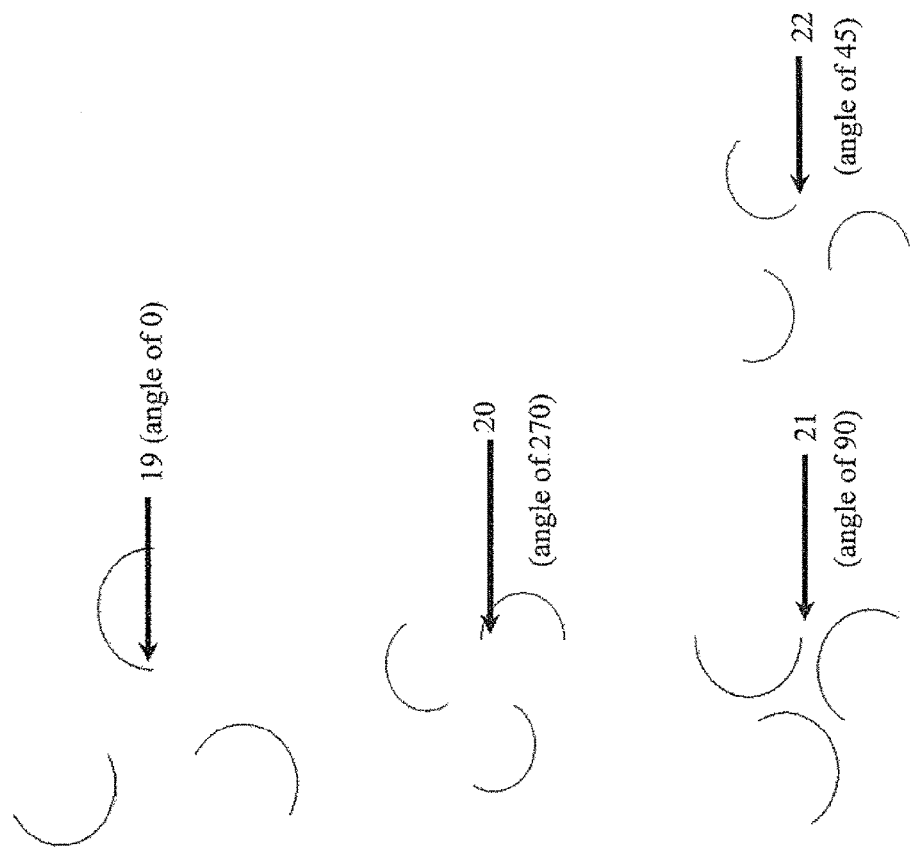
FIG. 5 is a cross-sectional diagram of some angles and diameters of interest for a 3-bladed vertical axis turbine

FIG. 5 is a cross-sectional diagram of some angles and diameters of interest for a 3-bladed vertical axis turbine. All the blades shown are exact semicircles for modeling purposes, however in other embodiments they may be variants on semicircles, and may taper, have at least double curves, have lips above, below, and in the center, etc. These diagrams explain the models simulated in the following table: The outer diameter for each one of these cases is:

| β | D (m) |
|---|---|
| −90 | 3.10 |
| −45 | 3.65 |
| 0 | 3.8 |
| 45 | 3.55 |
| 90 | 2.88 |
| 100 | 2.70 |

The blades in this figure can move in and out from an axis point of a connection with an arm or shaft.

All blades are identical in the simulation. The radius changes due to the rotation of each blade defined by the angle β. The pivot of rotation is at a radius of 600 mm and the diameter of the half-circular blades is 1300 mm. Arrangement (19) is at 0 degrees, (20) is at −90 or 270 degrees, (21) is at +90 degrees, (22) is at. +45 degrees. Note the use of a single reference point. It is reasonable to say that each parameter has a range of 20% of the value stated, so that variations are substantially close.

The figures in FIG. 5 are an essential component of the implementation of the concept, and integrally related to it. In general, three-bladed turbines in this configuration appear to be the most efficient, so the combination of three blades with all configurations mentioned here is both efficient and unique.

Figure 6:
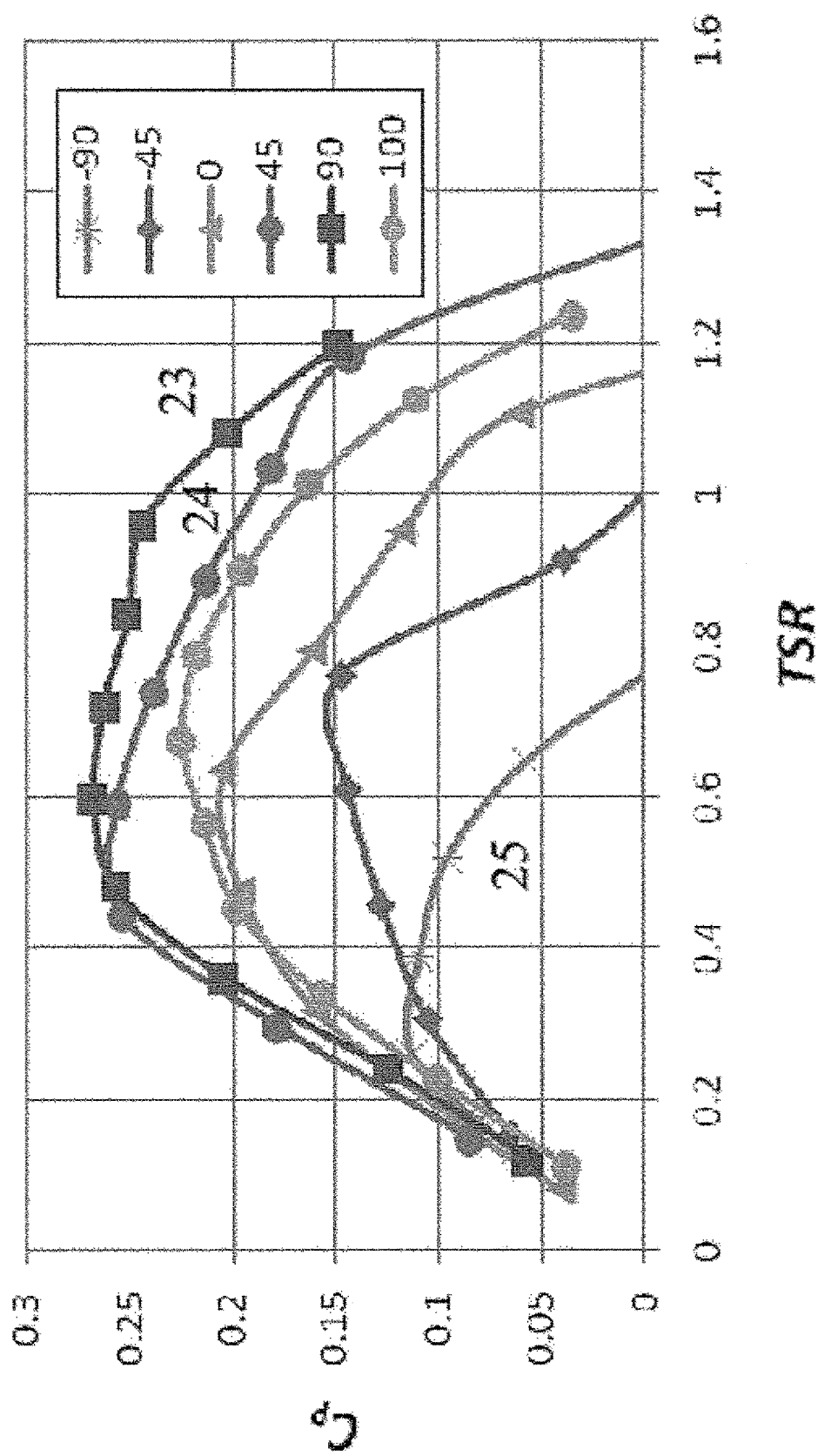
FIG. 6 is a diagram of Cp versus TSR for different angular configurations of a 3-bladed vertical axis turbine.

FIG. 6 is a diagram of the coefficient of power (Cp—basically, the efficiency if converted to percentage terms, wherein higher is better) versus TSR for different angular configurations of a 3-bladed vertical axis turbine. This is based on computer models of performance. The important point is the impact of the combination of angle plus TSR on Cp, the efficiency of the turbine's fluid dynamics. The different positions are a crucial part of the invention, because they demonstrate that changes in the angle and diameter of vertical axis turbines in specific configurations are crucial in building a turbine that functions well in low speed conditions and can decrease its efficiency (and therefore its survivability, whether of the turbine's mechanics or the electrical systems) at extremely high wind speeds. Therefore both the highest and lowest Cp values are of the greatest interest, because one turbine can be made to attain both.

This is an enhanced 2-D simulation, so the results are more positive than for a 3-D, because edge effects would decrease efficiency. In various embodiments, the cross-sectional shape of a semicircle need not be exactly semicircular nor the same shape throughout the blade. In various embodiments, it tapers and/or it is in the shape of a double curve. In one embodiment, it dips inward from the outer superior and/or inferior edge within 20% of the edge and then extends outward at a slightly different angle.

TSR=tip speed of blade/wind speed.

Speed of the tip=2×pi×r/Time where r is radius.

Lines (23) and (24) show the greatest efficiency. Line (25) in this sequence shows the least. This means that a turbine can switch in high winds from the +45 to +90 degree positions to the range of the −90 degree position to reduce the amount of power produced in a high wind. One could summarize this method as adjusting the blade configuration plus TSR to produce different outputs at different wind speeds.

Figure 7:
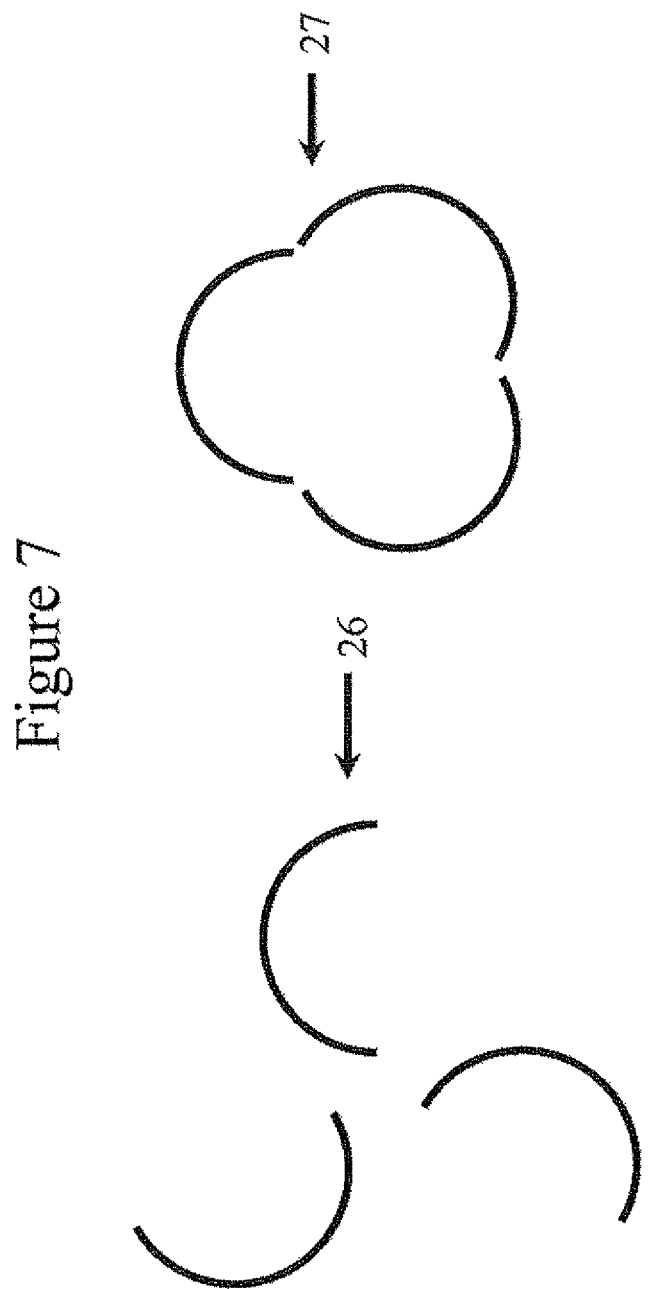
FIG. 7 is a diagram of one method of retraction of a three-bladed vertical axis turbine.

FIG. 7 is a diagram of one type of retraction of a three-bladed vertical axis turbine. In this case, an open (26) 3-bladed system contracts in the direction of the inside of the blade to position (27), where the wind will do little to rotate the turbine.

Figure 8:
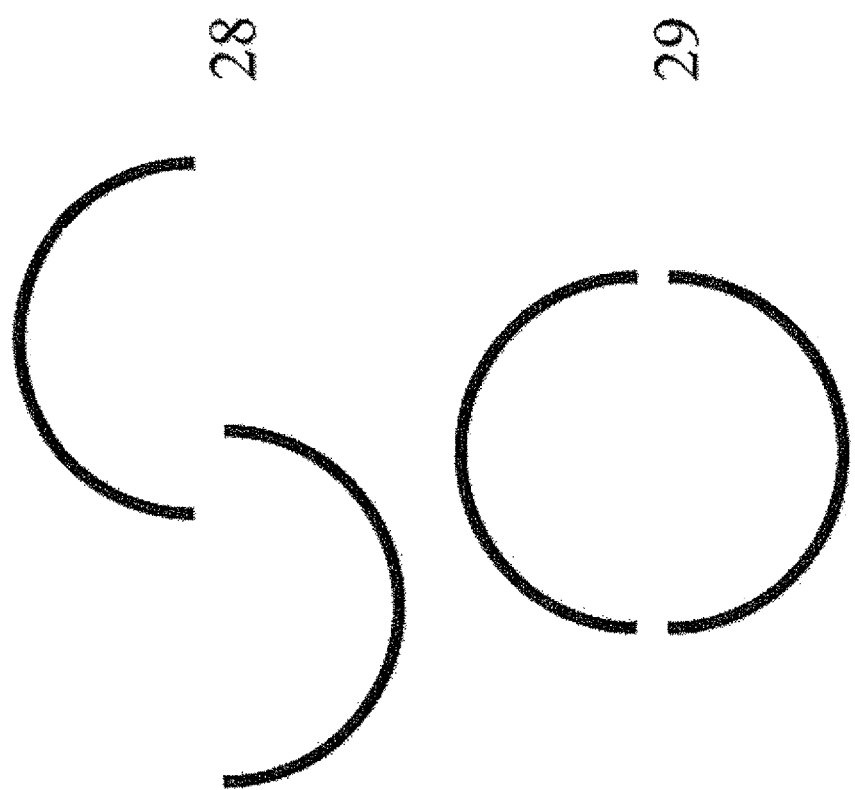
FIG. 8 is a diagram of one method of retraction of a two-bladed vertical axis turbine.

FIG. 8 is a diagram of one method of retraction of a two-bladed vertical axis turbine. In this case, an open (28) 2-bladed system contracts in the direction of the inside of the blade to position (20), where the wind will do little to rotate the turbine.

Figure 9:
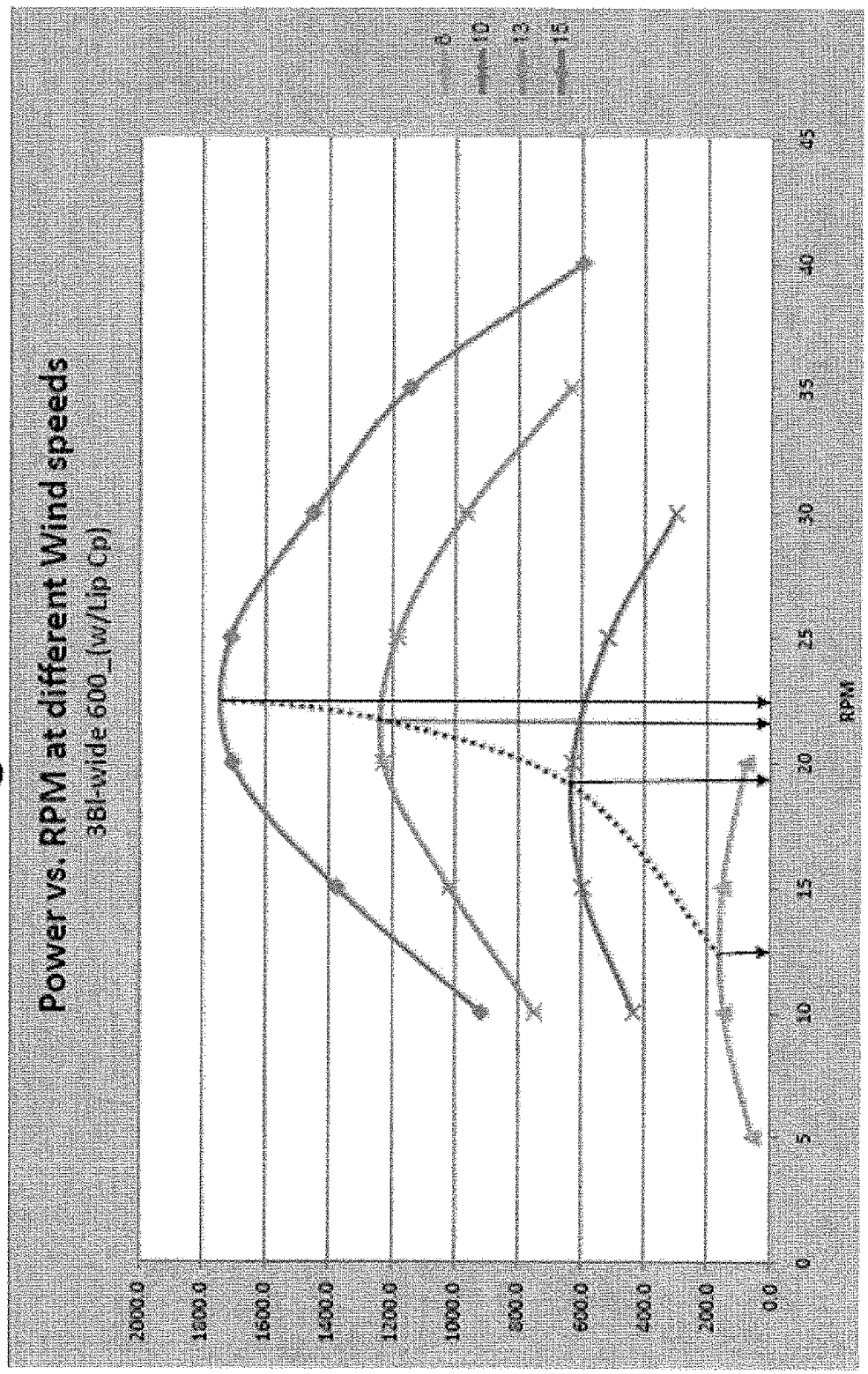
FIG. 9 is a diagram of rpm at different wind speeds.

FIG. 9 is a diagram of rpm at different wind speeds. It is a simulation of a specific drag-type vertical axis turbine. The optimal rpm is fairly linear up to 10 m/s and stabilizes thereafter in a very narrow range as wind speeds increase. That means that a typical generator system will not work adequately here, as most generator systems depend on a linear response of voltage in relation to increased rpm. The solution would be electronically controlled addition of load, as through either calling extra windings into action, by removing shielding, or increasing the charge or number of the electromagnets, in various embodiments. To do this without electronic control, an automatic mechanical system could be deployed which links the generator components to an rpm counter and uses various means to increase the load on the generator and thereby increase the ability to capture the torque. In one embodiment, these changes only start above 10 m/s wind. Another way of expressing this would be a generator for a turbine that responds to changes in torque by changing parameters of the generator, such as those mentioned above.

While the invention has been described with respect to a limited number of embodiments, it will be appreciated that many variations, modifications and other applications of the invention may be made.

SUMMARY OF THE INVENTION

The present invention successfully addresses the shortcomings of the presently known configurations by providing a wind turbine with variable parameters.

It is now disclosed for the first time a vertical axis turbine system, comprising
a. At least two solid blades, connected directly or by at least one arm to a rigid central shaft capable of rotation, said shaft defined as comprising any attached components necessary for operation and attachment of the blades, on a stable central axis,
b. Means wherein said system changes the turbine diameter, measured from the points of attachment of the arm to the outermost part of the blade and the center of the shaft, and/or angle of the blade in relation to the central shaft.

In one embodiment, the system further comprises: three blades.

In one embodiment, the system further comprises:
An expandable or retractable arm.
According to another embodiment, the means comprises:
  c. A motor disc connected to the shaft,
  d. A rotating arm connecting the disc to the blade,
  e. A slide arm connecting the disc to the blade, wherein . . .

According to another embodiment, the means comprises:
  c. A drive disc connected to the shaft,
  d. A driven disc attached to the blade,
  e. A connecting arm connecting the drive to the driven disc, wherein . . .

According to another embodiment, the means comprises:
  c. A drive disc connected to the shaft,
  d. A driven disc attached to the blade,
  e. A chain connecting the drive to the driven disc, wherein . . .
  f. A tension gear connected to the drive shaft and the chain, wherein . . .

In one embodiment, the system further comprises:
  c. A means of electronic or microprocessor control of parameters of the system, comprising but not limited to diameter, angle, and speed of rotation.

In one embodiment, the system further comprises:
said means capable of adjusting the blade towards the shaft in the direction of its rear surface or its front surface or both.

It is now disclosed for the first time a method of changing the diameter and/or blade angle of a vertical axis turbine with a central solid shaft, and at least one arm or driving device, and at least one blade, at various speeds, using means wherein said arm or driving device changes the blade diameter and/or angle, measured from the points of attachment of the arm or driving device to the blade to the shaft.

In one embodiment, the system further comprises: the step of: at least one change in diameter and/or angle is accomplished by either mechanical or electronic control of changes in the turbine system tied to a specific velocity of the surrounding fluid environment.

According to another embodiment, the TSR and the blades' angle configuration are matched to change the Cp so it is higher at lower fluid speeds.

According to another embodiment, the means fold the blades in the direction of their interior.

According to another embodiment, the folding occurs one blade at a time while the external side of the blade faces the oncoming fluid.

It is now disclosed for the first time a three bladed, vertical axis turbine, comprising the following parameters, in any ratio within 20% of the parameters as follows:
  a. Substantially semi-circular blades of any vertical distance, wherein the ratios specified may refer to any point on the blades, or the average, maximum, or minimum,
  b. Blade diameter of 1300 millimeters,
  c. Closest point to the center of the shaft from the interior edge of the blade of 600 millimeters.

According to another embodiment, the angles of the blades, defined according to a 360-degree circle, with positive in the counterclockwise direction from the horizontal, wherein both ends of the semicircle are on the horizontal and the semicircle is in the positive direction from that horizontal, from the closest point to the shaft, is in the range of +45 to +90 and +270 to +315 degrees or any point therein.

According to another embodiment, the blade has a double-curve shape and/or tapering in at least one vertical direction and/or a horizontal lip on the superior and/or inferior edge of the blades and/or in the middle.

According to another embodiment, the TSR is between 0 and 1.4.

In one embodiment, the system further comprises: a means of increasing load on the generator when the rpm increases by less than 5 for every 100% change in the power of the turbine.

It is now disclosed for the first time a method of adjusting the TSR and turbine blade geometries simultaneously via mechanical or electronic control means to produce changes in the Cp of a vertical axis turbine.

What is claimed is:
1. A vertical axis turbine, comprising:
a plurality of blades;
a central shaft in communication with each blade of the plurality of blades;
each said blade comprising:
  a substantially semicircular body including a leading side and a trailing side between oppositely disposed internal and external edges, each said blade being concave on the trailing side, and convex on the leading side; and,
  wherein each said blade is of a diameter of a length d based on the diameter of the arc of the blade from the internal edge to the external edge, and the internal edge is a predetermined distance of a length p from the central shaft, wherein airspace is present between the internal edge and the shaft, and the internal edge does not overlap the shaft, such that the ratio of the length of d to p is 13:6 with a variation of 20% in each said lengths d and p of the ratio.

2. The turbine of claim 1, wherein each said blade includes a horizontal axis which is oriented at a blade angle, defined according to a 360-degree circle, with positive in the counterclockwise direction from the horizontal, from approximately the middle of each said blade along the internal edge to the central shaft, and the angle from the internal to external edge is in the range of approximately +45 to +90 degrees and +270 to +315 degrees, which is defined as a high efficiency configuration, and wherein other values are defined as a low efficiency configuration.

3. The turbine of claim 2, further comprising: a pivot to change the blade angle from a high efficiency configuration to a low efficiency configuration.

4. The turbine of claim 1, wherein each of said blades are of a double-curve shape and adjacent to at least one of a top edge and a bottom edge of each said blade.

5. The turbine of claim 1, wherein a tip speed ratio (TSR) for each said blade is between 0 and 1.4.

6. The turbine of claim 1, wherein the plurality of blades includes at least two blades.

7. The turbine of claim 1, wherein the plurality of blades includes at least three blades.

8. The turbine of claim 1, wherein each of the blades are movable inward from the predetermined distance p to a second distance closer to the central shaft less than p.

9. The turbine of claim 1, wherein the external edge of each of said blades is movable inward along an axis proximate to the central shaft.

10. The turbine of claim 1, further comprising
a pivot in communication with the central shaft and the at least one blade, the pivot configured for adjusting the turbine diameter by moving the at least one blade, with respect to the central shaft, between an inward position and an outward position, such that the movement between the inward position and the outward position changes the turbine diameter along the axis perpendicular to the central shaft.

11. The system of claim 10, wherein the pivot comprises:
a motor disc in communication with the central shaft,
a rotating arm in communication with the motor disc and the at least one blade, and,
a slide arm in communication with the motor disc and the at least one blade.

12. The system of claim 10, wherein the pivot comprises:
a drive disc in communication with the central shaft,
a driven disc in communication with the at least one blade,
a connecting arm in communication with the drive and the driven disc.

13. The system of claim 10, wherein the pivot comprises:
a drive disc in communication with the central shaft,
a driven disc in communication with the at least one blade,
a chain operatively coupling the drive to the driven disc, and,
a tension gear in communication with the drive shaft and the chain.

14. The system of claim 10, wherein said pivot folds the external edge of the at least one blade towards the central shaft.

15. The turbine of claim 10, wherein said pivot comprises a moveable arm attached to the internal edge of the blade, and to the central shaft.

16. The turbine of claim 10, further comprising:
a processor based controller for controlling at least one of: positioning, angular orienting, and rotational speed, of the at least one blade.

17. A method of changing the angle of attack of a plurality of blades of a vertical axis wind turbine comprising:
providing
at least one blade in communication with a central shaft, the at least one blade rotatable about an axis of rotation, the axis of rotation being parallel to the central shaft, the at least one blade including an internal edge and an external edge;
each said blade comprising:
a substantially semicircular body including a leading side and a trailing side between oppositely disposed internal and external edges, each said blade being concave on the trailing side, and convex on the leading side; and,
wherein each said blade is of a diameter of a length d based on the diameter of the arc of the blade from the internal edge to the external edge, and the internal edge is a predetermined distance of a length p from the central shaft, wherein airspace is present between the internal edge and the shaft, and the internal edge does not overlap the shaft, such that the ratio of the length of d to p is 13:6 with a variation of 20% in each said lengths d and p of the ratio
and,
a pivot in communication with the central shaft and the at least one blade, the pivot configured for adjusting the turbine diameter by moving the at least one blade, with respect to the central shaft, between an inward position and an outward position, such that the movement between the inward position and the outward position changes the turbine diameter along the axis parallel to the central shaft; and,
adjusting the angle of the at least one blade to accommodate varying wind speeds.

18. The method of claim 17, wherein the pivot folds the external edge of the at least one blade in the direction of a trailing side.

19. The method of claim 17, wherein angle of attack and a Tip Speed Ratio (TSR) are adjusted simultaneously.

20. The method of claim 17, wherein the diameter of the turbine from external edge to external edge is reduced in higher wind speeds above a predetermined wind speed.

* * * * *